Dec. 14, 1965   W. J. HOMAN   3,222,754
METHOD OF MAKING MAGNETIC TRANSDUCER HEAD
Filed Dec. 23, 1959
FIG_1
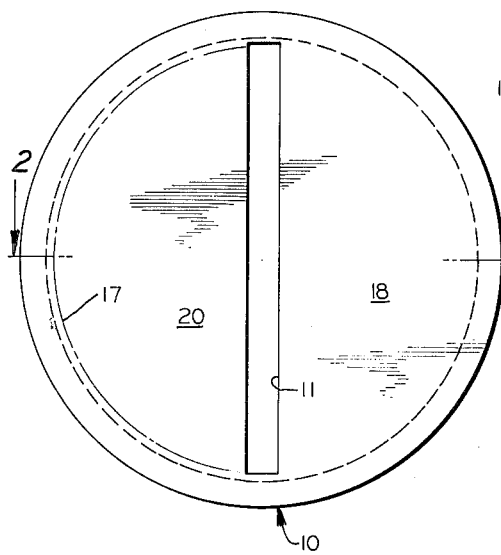
FIG_2
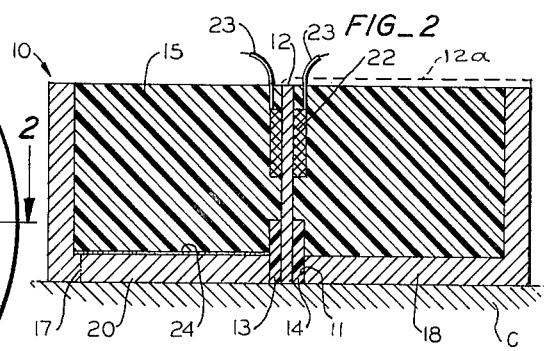
FIG_3
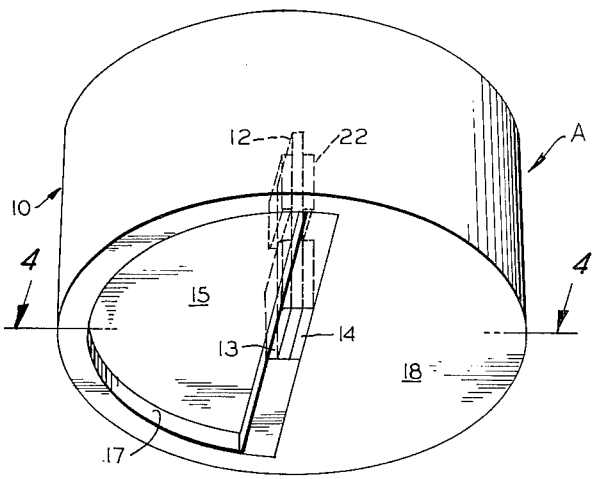
FIG_4
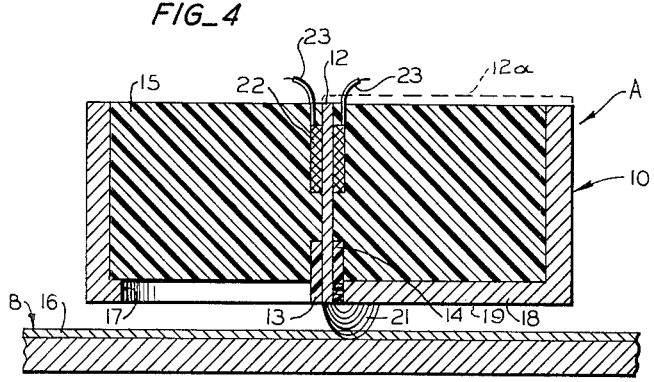
INVENTOR.
WILLIAM J. HOMAN
BY Hansen and Lane
ATTORNEYS though the probe 12 has been potted in place, the bottom of the shield may be cut at 17 on only one side of the probe 12 to provide a spacer for that side only. This does not depart from the invention herein.

United States Patent Office 3,222,754
Patented Dec. 14, 1965

3,222,754
METHOD OF MAKING MAGNETIC
TRANSDUCER HEAD
William J. Homan, San Jose, Calif., assignor to International Business Machines Corporation, New York, N.Y., a corporation of New York
Filed Dec. 23, 1959, Ser. No. 861,512
3 Claims. (Cl. 29—155.5)

The present invention relates to transducers, and pertains more particularly to a low cost, high performance, multiple element transducer head, and to the method of making it.

The use of electro-magnetic transducer heads in conjunction with records having a coating of magnetically permeable material thereon is well known. Such transducer heads and records are used for recording and playing back sound impulses, and also for recording, storing and recovering information "bits" as they are called, in electronic computers and data processing machines. For the latter purpose it is important to have the information bits clear and distinct, and as small as practicable, since the clearer they are, the greater is the probability that they will be picked up distinctly and without interference from adjacent bits, and the smaller they are, the more bits can be provided per inch of record track.

The present invention provides a simple, low cost transducer head for use in conjunction with a magnetic surfaced record, and one which can be cheaply produced with a high degree of accuracy and capable of clearly recording and recovering extremely small information bits from a record surface.

A further object of the invention is to provide an improved and simplified method for making a transducer head.

These, and other objects and advantages of the invention, will be apparent from the following description and the accompanying drawings, wherein:

FIG. 1 is a bottom elevation view of a magnetically permeable transducer shield ready for the mounting of a probe therein.

FIG. 2 is a section view taken along line 2—2 of FIG. 1 after a probe and its associated spacers have been potted therein, a portion of a support member being shown, and an optional extension of the upper end of the probe being shown in broken lines.

FIG. 3 is a perspective view showing the side and bottom of the assembly of FIG. 2 after the cutting away of a shield bottom portion on one side of the probe to complete the transducer head.

FIG. 4 is a sectional view taken along line 4—4 of FIG. 3, and shows the completed transducer in operative relation with a magnetic surfaced record, the optional extension of the probe of FIG. 2 being shown in broken lines.

Briefly, in the illustrated form of the invention, a transducer head A (FIGS. 3 and 4) is made by providing a shell or shield 10 of magnetically permeable material having a slot 11 of known width therein. Fitted into the slot, and flush with the bottom of the shield, is a magnetically permeable metal probe 12 with spacer means comprising non-magnetic spacer elements 13 and 14 mounted one on each side thereof to space the probe from the shield. The probe and its spacer means are potted in a hardenable, insulative material 15, poured into the shield 10 and allowed to harden therein. After the potting material 15 has hardened, the bottom of the shield 10 is cut away well clear of the probe 12 on one side of the slot 11, as along the line 17. The transducer head A is adapted to co-operate in a well known manner with a conventional magnetic record B, which may be of aluminum with a coating 16 thereon of suitable magnetic material such as iron oxide.

Referring to the drawings in greater detail, the shield 10 is of magnetically permeable material, such as, for example, iron, steel or other suitable magnetic alloy. The specific shape of the shield 10 is not material to the invention, but it is herein illustrated as cup-shaped, and it is preferred to have the bottom surface 19 of the remaining side portion 18 of the shell formed to conform to the recording surface of a magnetic record, such as the record B, with which the transducer A is adapted to be used.

The slot 11 is of a desired length, substantially greater than the width of the probe 12 to be mounted therein, and is of a width to receive the probe 12 and its spacing means, such as the spacer elements 13 and 14, in closely fitted relation therein. The probe 12 is of suitable magnetically permeable material of a desired size, and, as illustrated, the spacer members 13 and 14 are applied one to each side of the probe 12 at its lower end.

The spacer 13, as illustrated, is not essential to the invention, since the bottom portion 20 of the shield on that side of the probe 12 is to be cut away prior to the completion of the head A. However, with both sides of the assembly symmetrical, as shown in FIG. 2, either side of the shield bottom may be cut away to produce the completed head A shown in FIGS. 3 and 4. Also, the spacing means may be in the form of a coating or plating applied to the entire lower portion of the probe, and then ground off of the lower end thereof.

After the probe 12 and its spacing means have been fitted into the slot 11 as shown in FIG. 2, the shield 10 may be placed on a suitable support C (FIG. 2), shaped to close off the bottom of the slot 11. The shield is then filled to a desired depth with a suitable hardenable, insulative, potting material 15, such as, for example, thermo or other setting types of plastic material, or liquid polyester or epoxy resin mixed with a suitable catalyst. This potting material solidifies and thereby firmly affixes or "pots" the probe 12 and its spacing means therein.

One side portion 20 (FIGS. 1 and 2) of the shield bottom is then cut away so as to be spaced well clear of the probe 12, as along the arcuate line 17. This leaves the probe 12 spaced from the remaining side portion 18 of the shield bottom by the non-magnetic spacer 14, so that magnetic lines of force, indicated at 21 in FIG. 4, may flow between the probe 12 and this remaining shield bottom portion 18 in the well known manner of a transducer head for cooperation with the magnetic surfaced record B.

To facilitate the removal of the portion 20 of the shield bottom after potting the probe and spacer means, the upper surface of such bottom portion may be pre-coated with a material 24 (FIG. 2), such as wax, to which the potting material will not adhere. The rest of the interior of the shield 10 is not surface treated, since it is desirable to have the potting material adhere thereto.

A magnet coil 22 may be wound on the probe 12 before the latter is inserted or potted in the material 15, so that the coil 22 will also be sealed or potted in this material when the latter sets up or hardens. Conductor wires 23 from the coil 22 may be positioned to project from the hardened potting material 15 to facilitate connection of said coil, in a conventional manner, into a circuit (not shown) with which the transducer head A is to be used.

The straight probe 12 shown in FIG. 3, and in solid lines in FIGS. 2 and 4, is satisfactory when the transducer A is to be used for recording or "writing," and is also useable when the transducer is to be used for receiving or "reading." However such construction provides a high reluctance path, and low inductance circuit. It is preferred, therefore, that when a transducer is to be used solely for receiving or "reading," that it be made with the proble element 12 extending laterally at its upper end, as indicated in broken lines 12a in FIGS. 2 and 4, into magnetic contact with the shield 10.

The invention provides a simple, inexpensive and effective transducer head which is capable of operating very closely to a magnetic record surface, and the herein disclosed method for making such head eliminates the need for expensive jigs or fixtures during manufacture.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. The method of making a transducer head which comprises providing a cup-shaped magnetically permeable shield with a portion of the bottom acting as a temporary holding means, cutting an elongated slotted opening of accurately dimensioned width in the bottom of the shield, fitting into such slotted opening a magnetically permeable probe, and non-magnetic spacing means, of a total combined thickness equal to the width of the slotted opening, whereby the probe is supported in upwardly extending condition within the opening, the probe being of a width substantially less than the length of the slotted opening, and centered therein, applying to said temporary holding means inside the cup a coating substance of non-adherent material, potting the probe in a flowable, solidifying non-magnetic material, and removing said temporary holding means along one side of the probe by cutting well beyond the probe toward both ends of the slotted opening after the potting material has solidified.

2. The method of making a cup-shaped shielded transducer head, with a portion of the shield bottom acting as a temporary holding means, which comprises providing a probe-receiving opening in the bottom of a cup-shaped shield of magnetically permeable material having a removable bottom portion therein, placing the shield on a support shaped to conform thereto, inserting the lower end of an upright probe of magnetically permeable material into said opening flush with the under surface of the shield bottom and in accurate, slightly spaced relation to one side of the slotted opening providing a filler for said space whereby the probe is held in upright position in said opening, coating the upper surface of said portion of the bottom acting as a temporary holding means opposite to said one side of the slotted opening with a substance to which a potting material to be used will not adhere, potting the probe in such position in a quantity of flowable, solidifying material, solidifying the potting material to affix the probe in such position, and removing said temporary holding means.

3. The method of making a transducer head which comprises providing a magnetically permeable cup-shaped shield, with a portion of the shield bottom acting as a temporary holding means, providing an opening in the bottom of the shield bounded on one side thereof by said temporary holding means, fitting into such opening a magnetically permeable probe and non-magnetic spacing means of a total combined thickness equal to the width of the opening, whereby the probe is supported in the opening in upwardly extending condition within the shield, coating the inside of the bottom portion acting as a temporary holding means with a non-adherent coating material, pouring into the shield a quantity of flowable, hardenable, non-magnetic potting material, hardening the potting material, and removing the portion of the bottom acting as a temporary holding means.

References Cited by the Examiner

UNITED STATES PATENTS

| | | | |
|---|---|---|---|
| 2,523,515 | 9/1950 | Porter | 179—100.2 |
| 2,612,681 | 10/1952 | Camras | 29—155.58 |
| 2,621,259 | 12/1952 | Grantham | 179—100.2 X |
| 2,754,569 | 7/1956 | Kornei | 29—155.57 |
| 2,801,293 | 7/1957 | Howell et al. | 179—100.2 |
| 2,846,517 | 8/1958 | Farrand et al. | 179—100.2 |
| 2,920,379 | 1/1960 | Hagopian | 29—155.58 |
| 2,927,163 | 3/1960 | Brower | 179—100.2 |
| 2,943,384 | 7/1960 | Wisner | 179—100.2 X |
| 2,951,912 | 9/1960 | Sherman et al. | 179—100.2 |

BERNARD KONICK, *Primary Examiner.*

ROBERT H. ROSE, *Examiner.*